United States Patent [19]

Yamazaki et al.

[11] Patent Number: 4,550,631

[45] Date of Patent: Nov. 5, 1985

[54] INDEXING SYSTEM OF MACHINE TOOLS AND THE LIKE

[75] Inventors: Yoshinori Yamazaki, Koganei; Tsutomu Ogawa, Fuchu, both of Japan

[73] Assignee: Kabushiki Kaisha Miyano Tekkosho, Ueda, Japan

[21] Appl. No.: 536,356

[22] Filed: Sep. 27, 1983

[30] Foreign Application Priority Data

Oct. 6, 1982 [JP] Japan ................ 57-176894

[51] Int. Cl.⁴ .......................... B23B 3/16; B23B 7/04; B23B 29/32; B23B 39/20
[52] U.S. Cl. .................... 74/822; 82/36 A; 29/48.5 R; 91/45; 269/70; 408/35
[58] Field of Search ........... 82/36 A; 74/813 L, 820, 74/822; 91/45, 35, 44; 408/35; 29/48.5 R, 48.5 A; 269/69, 70

[56] References Cited

U.S. PATENT DOCUMENTS

| 2,645,981 | 7/1953 | Hirvonen | 74/822 |
| 3,064,499 | 11/1962 | Bullard | 74/822 |
| 3,141,356 | 7/1964 | Herbkersman | 74/822 |
| 3,320,838 | 5/1967 | Jaggle | 74/822 |
| 3,581,602 | 6/1971 | Bachmann | 74/822 |

Primary Examiner—Francis S. Husar
Assistant Examiner—William E. Terrell
Attorney, Agent, or Firm—Ladas & Parry

[57] ABSTRACT

In an indexing system for a member such as a turret head of a lathe, in which the member after undergoing an indexing movement is locked by a locking bolt thrust by spring force into a bolt hole in a plate coaxially fixed to the member, a hydraulic cylinder is used to exert a great force for holding the locking bolt positively and unmovably in each bolt hole against any reactive counter force from the side of the member due to a great load. The hydraulic cylinder is controllably actuated by a single hydraulic system containing also a hydraulic motor for driving the member in its indexing movement and a solenoid valve.

3 Claims, 5 Drawing Figures

INDEXING SYSTEM OF MACHINE TOOLS AND THE LIKE

BACKGROUND OF THE INVENTION

This invention relates generally to indexing systems of machines such as lathes and other machine tools. More particularly, the invention relates to an indexing system which is capable of producing a powerful mechanical holding action by which an indexed structure in determined index positions can be held positively against heavy loads, and which, moreover, has a locking mechanism functioning positively and accurately with respect to even an indexed shifting structure which moves at high speed.

Indexing systems and devices are widely used in machining operations. If the time required for carrying out the indexing of an indexing device is long, the total machining time will accordingly be lengthened and thus the productivity will be low. For this reason, there has been a great demand for high-speed indexing.

As one example, the indexing of the turret of a numerically-controlled (NC) lathe will be considered. Heretofore, the most common indexing process includes, along with use of a precision coupling, the sequential steps of (a) raising of the turret head to disengage a clamp of a coupling, (b) rotation of a turret indexing mechanism to carry out indexing of the turret head, and (c) retraction and clamping of the turret head in response to an indexing completion signal of the turret head. This indexing, however, requires a long time period of 1 to 3 seconds, so that the non-machining or non-productive time period is long in comparison to the total machining time, and thus this type of indexnig proves to be inefficient.

Furthermore, the above operational steps (a), (b), and (c) use hydraulic pressure and require two hydraulic circuits respectively for raising and retracting the turret head and for turret indexing. Accordingly, the system has been accompanied by the problems of high costs and complicated timing control.

Accordingly, an indexing system in which a geneva mechanism is utilized has been in use as a system capable of conforming to high-speed indexing. In this system, indexing movement is obtained by causing a pin of a crank functioning as a driving wheel to mesh intermittently with each of a plurality of radial slots provided in a driven wheel and is transmitted to the turret head. This system is provided further with a locking mechanism in which, after each indexing movement has been accomplished, a locking bolt is inserted and fitted by spring force into a bolt hole in a locking plate connected coaxially to this turret head thereby to hold and fix mechanically the indexed position, and, during the indexing movement, the locking bolt is extracted from the bolt hole overcoming the above mentioned spring force.

Since this locking mechanism depends solely on spring force acting on the locking bolt for locking, when a large load is exerted on the turret head as when heavy machining is being carried out, a reactive or counter force due to this large load acts to overcome at least partially the above mentioned spring force. Consequentially, the locking bolt is forced out of the bolt hole in the locking plate, whereby the turret head deviates from its index position.

This undesirable extraction movement of the locking bolt can be prevented by increasing the spring force (or spring constant), but this necessitates the use of a large spring. Furthermore, interrelatedly with the geneva mechanism, the cam mechanism for actuating the locking bolt in its insertion and extraction actions also becomes large, whereby it becomes difficult to make the indexing system compact, and, at the same time, the moving parts cannot respond quickly to high-speed motion. Accordingly, there is a limit to increasing the spring force.

SUMMARY OF THE INVENTION

According to this invention, there is provided an indexing system in which a geneva mechanism driven by a motor causes an indexing driven structure, such as the turret of a lathe, to undergo indexing movement, and the driven structure is placed and mechanically locked in a specific indexing position by the insertion and fitting of a locking bolt by spring force into a corresponding bolt hole in the indexing driven structure, during which indexing movement, the locking bolt is extracted out from the bolt hole by overcoming the spring force, said indexing system being characterized by an actuator mechanically interrelated to the locking bolt in a manner to positively fit and hold the same in the hole against a reactive counter force from the side of the indexing driven structure and control means for causing the actuator to operate to fit and hold the locking bolt in the hole during the time period from the instant of completion of indexing movement of the indexing driven structure to the time immediately prior to the start of its succeeding indexing movement.

The nature, utility, and further features of this invention will be more clearly apparent from the following detailed description with respect to a preferred embodiment of the invention when read in conjunction with the accompanying drawings, briefly described below.

DETAILED DESCRIPTION OF THE INVENTION

Figure 1:
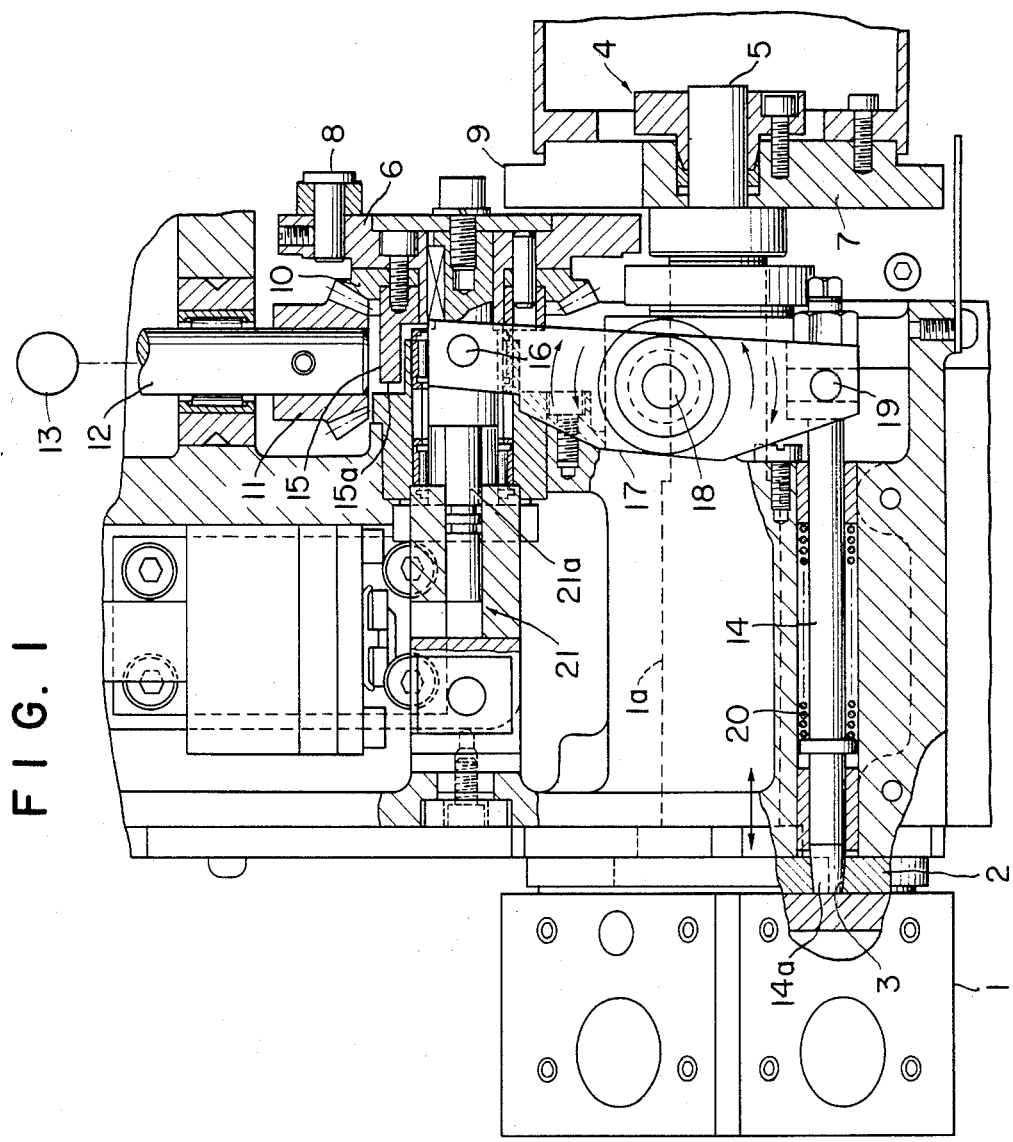
FIG. 1 is a plan view, with parts cut away and parts shown in section, showing the essential construction of the mechanism of one example of the indexing system according to this invention.
Figure 2:
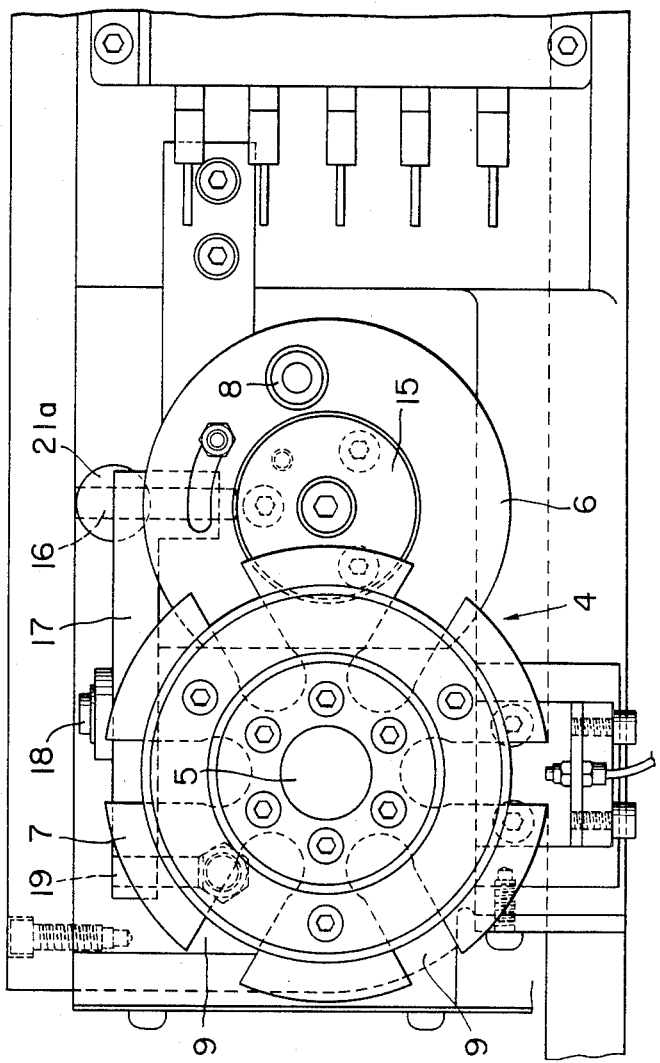
FIG. 2 is a side view of the mechanism shown in FIG. 1 as viewed from the right.

Referring first to FIGS. 1 and 2, the indexing mechanism illustrated therein is adapted to index a driven structure 1 to be indexed, which in this example is a hexagonal flat turret head in a turret lathe. This turret head 1 has an indexing pitch angle of 60 degrees around the turret axis.

On the back or inner side of this turret head 1, a locking plate 2 is fixed to the turret shaft and is coaxially coupled to the turret head 1 to rotate unitarily therewith. This locking plate 2 is provided on a common circle around its central axis at equally spaced intervals with tapered bolt holes 3 of a number corresponding to the above mentioned indexing pitch angle, these bolt holes 3 being formed through the locking plate 2.

The turret shaft 1a of the turret head 1 is directly coupled to the output shaft 5 of a geneva mechanism 4, whereby the indexing rotational movement of this geneva mechanism 4 is transmitted to the turret head 1.

Since the geneva mechanism 4 is of known construction, only it principal features will be described here. As also shown in FIG. 2, this mechanism comprises essentially a crank 6 constituting a driving wheel, a pin 8 projecting perpendicularly from the crank 6 at a point intermediate between its center and its periphery, and a disc 7 constituting a driven wheel and having six slots 9 formed around its axis at equal angular intervals and extending radially outward with open ends. The pin 8 is adapted to engage successively with the slots 9, whereby, as the crank 6 rotates through one revolution, the disc 7 is rotated through 60 degrees of angle. This rotation of the disc 7 is transmitted through the output shaft 5 to the turret head 1 and the locking plate 2.

Figure 3A:
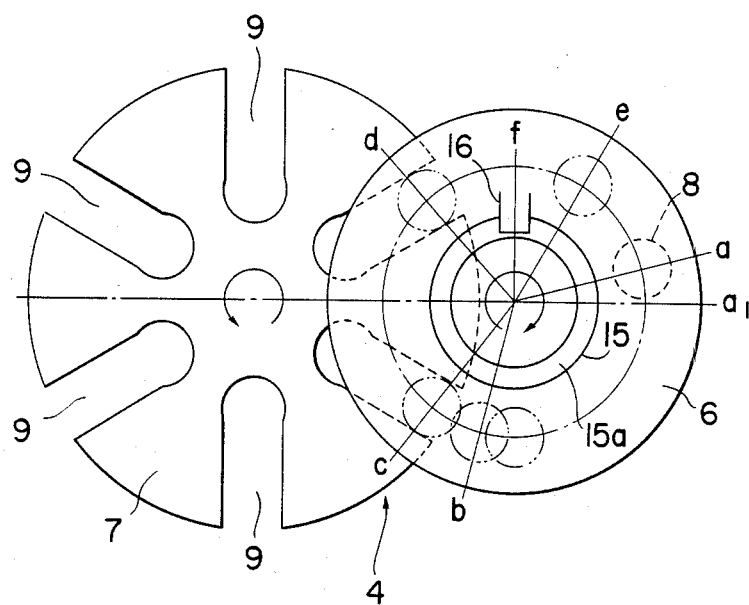
FIG. 3A is a diagrammatic side view showing a disc, a crank, a pin, an annular locking cam, and a cam follower of a geneva mechanism in the mechanism shown in FIGS. 1 and 2.

Rotational power is produced by a motor 13 (FIG. 1) and transmitted to the crank 6 by way of a driving shaft 12 coupled thereto, a driving bevel gear 11 fixed to the driving shaft 12, and a driven bevel gear 10 meshed with the driving bevel gear 11 and coaxially coupled to the crank 6. In the time period from the instant at which the motor 13 starts in response to a command signal as described hereinafter and its power transmitted as described above causes the pin 8 to rotate from its starting position a as shown in FIG. 3A to the instant at which the pin 8, after rotating through substantially one revolution, stops, the disc 7 is driven to rotate through 60 degrees of angle.

Figure 3B:
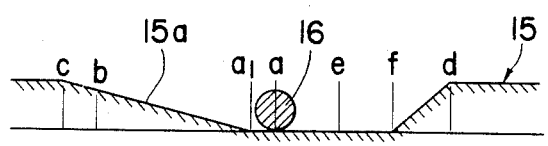
FIG. 3B is a development diagram indicating the profile as a linear expansion of the cam in FIG. 3A.

An annular locking cam 15 is coaxially secured to the above described crank 6 and has an annular cam surface 15a on its side opposite the crank 6. This annular cam surface 15a is a specific surface with high and low portions in the crank axis direction as indicated by the development of its cam profile in FIG. 3B and functions, as the cam rotates, to actuate a cam follower 16.

This cam follower 16 is in contact with the cam surface 15a at its lowest (as viewed in FIG. 3B) part when the pin 8 of the crank 6 is at the starting position a. Then, starting from a position a₁, which the pin 8 reaches when it revolves through approximately 15 degrees 30 minutes, the cam follower 16 is progressively raised to a high position as the pin 8 continues to revolve through 105 degrees and, passing a position b, continues further through 128 degrees 30 minutes to reach a position c at which the pin 8 begins to engage with a slot 9 of the disc 7. Then, as the pin 8 revolves further through 57 degrees and begins to disengage from that slot 9 at a position d, the cam follower 16 is raised to its highest (as viewed in FIG. 3B) position. As the pin 8 revolves approximately 43 degrees further to a position f at which a stopping signal is generated, the cam follower 16 is gradually lowered to its original lowest position. The profile of the annular cam surface 15a is so shaped as to produce the above described movements of the cam follower 16.

Referring again to FIG. 1, the cam follower 16 is fixed to one end of a lever 17, which is pivotally supported at a part thereof intermediate between its two ends by a shaft 18. The other end of the lever 17 is in the shape of a yoke or fork with a slot in which an engagement pin 19 is slidably engaged. This engagement pin 19 is fixed perpendicularly to a rear end part of a locking bolt 14, which is slidably supported by a frame structure of the indexing mechanism and has at its other front end a tapered tip 14a confronting a specific point in the path of revolution of the aforedescribed bolt holes 3 of the locking plate 2. The locking bolt 14 is continually urged toward the locking plate 2 by a compressed coil spring 20 disposed around the locking bolt 14 and functioning additionally to cause the above described cam follower 16 to be continually pressed against the cam surface 15a of the annular cam 15.

The indexing mechanism is further provided with a direct-action actuator 21, which in the instant example is a hydraulic cylinder of the cylinder-and-plunger type. The plunger or piston rod 21a is disposed parallelly to the axis of the afore-described crank 6, and the outer end of the plunger 21a is in contacting engagement with the cam follower 16 in a state whereby an outwardly extending hydraulic force on the plunger causes the cam follower 16 to be pressed with additional force against the cam surface 15a. The hydraulic cylinder 21 has a capacity such that it can cause the application on the locking bolt 14 of a force fully sufficient to prevent its being retracted from a bolt hole 3 by a reaction force from the side of the turret head 1.

For the motor 13 for driving the aforedescribed geneva mechanism, a hydraulic motor such as, for example, a uniflow, fixed-displacement type hydraulic motor is used. To drive this hydraulic motor 13 and the above described hydraulic cylinder 21, a single common hydraulic circuit is used as control means for imparting a positive and compulsory locking function to the locking bolt 14.

Figure 4:
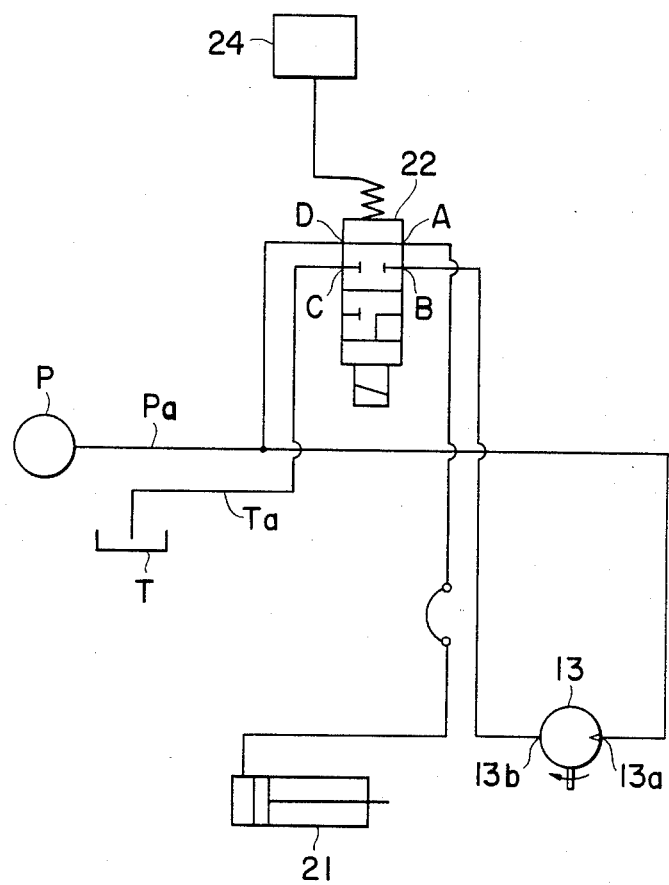
FIG. 4 is a hydraulic circuit diagram showing one example of a hydraulic actuating system of the indexing system.

One example of such a hydraulic circuit as illustrated in FIG. 4 comprises a changeover solenoid valve 22 of two-position, four-connection type, the hydraulic motor 13, the hydraulic cylinder 21, and a hydraulic piping connecting these components as shown. The hydraulic motor 13 has an inlet port 13a connected to a line Pa from a pump P and has an outlet port 13b connected to one actuator port B of the solenoid valve 22. The other actuator port A of the solenoid valve 22 is connected communicatively with the cylinder chamber of the hydraulic cylinder 21 into which hydraulic pressure is supplied for causing the plunger to extend outward, that is, the cylinder chamber for imparting the force for opposing the reactive force from the side of the turret head 1.

The solenoid valve 22 in the instant example is of the spring-offset type. When this valve 22 is inoperative, that is, when the solenoid is deenergized, one actuator port B and a port C leading to a reservoir T are respectively closed, and the other actuator port A and a port D connected to the pump P are communicative. When the solenoid valve 22 is operative, that is, when the solenoid is energized, the port D is closed, and, moreover, the port C and the two actuator ports A and B are commonly communicative.

By the above described arrangement of the hydraulic circuit, when the solenoid valve 22 is inoperative, the hydraulic cylinder 21 is supplied in the above mentioned cylinder chamber thereof with hydraulic pressure and operates to press the locking bolt 14 into a bolt hole 3 to be tightly fitted therein. On the other hand, the hydraulic motor 13 is stopped since its outlet port 13b is closed.

Conversely, when the solenoid valve 22 is operative, the cylinder chamber of the hydraulic cylinder 21 is communicative with the reservoir T, whereby the hydraulic cylinder 21 no longer exerts a force for pushing the locking bolt 14 toward a bolt hole 3, and the plunger or piston rod 21a of the hydraulic cylinder 21 is pushed back by the cam 15. On the other hand, the hydraulic motor 13 starts to drive since its inlet port 13a is communicative with the line from the pump P, and its outlet port 13b is communicative with the line Ta leading to the reservoir T.

The indexing system of the mechanical construction of its essential parts in combination with the hydraulic system constituting control means according to this invention as described above is controlled and operates in the following manner.

When one step of machining work at the turret head 1 has been completed, and an indexing operation becomes necessary, a signal for starting of indexing operation is appropriately produced and transmitted from a signal generator 24 (FIG. 4). The position of the pin 8 at this time is as indicated at a in FIG. 3A. In response to the starting signal thus transmitted from the signal generator 24, the solenoid valve 22 operates to drive the geneva mechanism 4 and at the same time causes the hydraulic cylinder 21 to become inoperative, and the active force for pushing the locking bolt 14 becomes zero.

As the crank 6 rotates and brings the pin 8 to the position $a_1$, the extraction of the locking bolt 14 begins, and the turret head 1 is released from its locked state. Then, as the rotation of the crank 6 proceeds further to cause the pin 8 to revolve from the position b to the position c, the locking pin 14 is extracted fully from the bolt hole 3, and the pin 8 engages with a slot 9, whereby the disc 7 begins to rotate.

When the disc 7 has rotated through about 60 degrees, the pin 8 reaches the position d and, as it revolves further, disengages from the slot 9, whereupon the disc 7 stops rotating. As a result, the turret head 1 undergoes an indexing rotation of 60 degrees, and, in concert with this rotation, the succeeding bolt hole 3 of the locking plate 2 reaches the position directly in front of and coaxially aligned with the locking bolt 14.

Then, as the crank 6 rotates further, and the pin 8 arrives the position f shown in FIG. 3A, a signal for stopping the indexing movement is appropriately produced. At this time, the locking bolt 14 is thrust by the force of the spring 20 to be fully inserted or fitted into the bolt hole 3, whereby the positioning and locking of the turret head 1 is accomplished.

In response to the above mentioned stopping signal, the rotation of the crank 6 is stopped, but before it comes to a full stop, its momentum causes the pin 8 to reach its original position a, whereupon one step of indexing is completed. Also in response to the stopping signal, the solenoid valve 22 becomes inoperative, whereby the hydraulic cylinder 21 operates, and the locking bolt 14 is forcibly thrust into the bolt hole 3 by the combination of the spring force and the hydraulic force. As a result, positive and tight fixing of the indexed position of the turret head 1 is attained.

While, in the illustrated embodiment, the mechanical parts are so constructed that the hydraulic cylinder 21 is caused to be interrelated to the cam follower 16 of the lever 17, this invention is not limited to such an arrangement. That is, for example, a direct-action actuator such as the hydraulic cylinder 21 may be coupled directly to the locking bolt 14, or any other suitable modification may be adopted as long as the same locking action can be obtained. Thus, such modifications are to be considered to be within the purview of this invention.

The indexing system according to this invention of the above described organization and operation has the following features of effectiveness and utility.

When the indexing driven member 1 is in an indexed position, the locking bolt 14 is not only acted upon by the spring force of the spring 20 but is forcibly thrust and fitted into a bolt hole 3 with a great force imparted by the direct-action actuator 21, which force fully overcomes the reaction force from the driven member 1. As a consequence, the total force acting on the locking bolt 14 is a great force by which positive fixing of the indexed position is accomplished with ample withstanding force against heavy loads. Thus, this indexing system contributes greatly to improvement of machining precision.

Furthermore, the indexing system of this invention can be applied by merely installing a direct-action actuator 21 such as a hydraulic cylinder in a conventional locking mechanism, whereby the construction is simple, and, moreover, the equipment cost can be kept low.

Still another feature of this invention is that the geneva mechanism 4 and the direct-action actuator 21 can be operated by a common hydraulic circuit, whereby the control system can be simplified, and at the same time it is possible to obtain positive indexing operation and positive locking operation of the locking bolt 14 with good cooperative timing therebetween. Furthermore, by fully utilizing the advantage of quick response speed of a hydraulic circuit, high-speed indexing and positive locking can be carried out, whereby the non-machining time between machining steps can be shortened thereby to increase the production efficiency.

What is claimed is:

1. An indexing system comprising:
    an indexing driven structure, such as the turret of a lathe; a hydraulic motor having an inlet port and an outlet port; a geneva mechanism driven by said motor for causing the indexing driven structure to undergo indexing movement, said geneva mechanism having a driving wheel;
    an annular locking cam fixed coaxially to said driving wheel of the geneva mechanism and having an annular cam surface with high and low portions in the axial direction of the driving wheel;
    a locking bolt for engaging the indexing driven structure to place and mechanically lock the same in a specific indexing position, said locking bolt being movable so as to be disengaged from the indexing driven structure;
    resilient means urging the locking bolt into engagement with the indexing driven structure;
    hydraulic actuator means having a plunger to be advanced when the actuator means is operated;
    a cam follower interposed between said annular cam surface and said plunger in such a manner that the force of the advancing plunger will cause the cam follower to be pressed against the cam surface;
    coupling means connecting said cam follower and said locking bolt in such a manner that when the plunger is advanced the locking bolt is shifted into positive engagement with the indexing driven structure against a reactive counter force from the same, said resilient means exerting such a force to said cam follower by way of said locking bolt and coupling means as to cause the cam follower to be continually pressed against said cam surface; and hydraulic circuit means including a change-over valve having, first and second ports at one side thereof and third and fourth ports at the other side thereof, said changeover valve being movable between a first changeover position and second changeover position, a hydraulic pressure source, a hydraulic fluid reservoir, hydraulic pipe means connecting said pressure source to said fourth port of the changeover valve and to said inlet port of the hydraulic motor, a motor exhaust pipe connecting said outlet port of the hydraulic motor to said first port, a single pipe line connecting said second port to said actuator means, and an exhaust conduit connectng said third port of the changeover valve to said reservoir, said first changeover position of the changeover valve causing said second and fourth ports theeof to communicate with each other whereby hydraulic fluid is allowed to flow from the pressure source to the hydraulic actuator means so as to cause the latter to operate to engage the locking bolt with the indexing driven structure, said first changeover position preventing communicative connection of said first and third ports thereby blocking said motor exhaust pipe so as to stop the motor and therefore the indexing movement, said second changeover position of the changeover valve causing said first and second ports to communicate with said third port whereby the outlet port of the motor is communicatively connected to the reservoir thereby to allow the motor to rotate and therefore the indexing movement to start and whereby the actuator means is caused to communicate with the reservoir by way of said single pipe line and as a result said high portion of the annular cam surface, which is rotated as a result of the indexing movement, pushes back the plunger via said cam follower thereby to disengage the locking bolt from the indexing driven structure.

2. An indexing system according to claim 1 wherein said coupling means is a lever pivotally supported at a part thereof intermediate between the two ends thereof, one end of the lever being pivotally joined to said locking bolt, the other end of the level carrying said cam follower to be acted upon by the actuator means so as to cause the lever to turn in a direction to move the locking bolt into engagement with the indexing driven structure.

3. An indexing system according to claim 1, further including signal generating means for causing said changeover valve to assume said first changeover position during the time period from the instant when the driven structure reaches a specific position upon completion of the indexing movement to the time immediately prior to the start of its succeeding indexing movement.

* * * * *